United States Patent [19]

Gourley

[11] 4,136,843
[45] Jan. 30, 1979

[54] TAPE CASSETTE HAVING REEL LOCKING MEANS THEREIN

[75] Inventor: Dennis R. Gourley, Salt Lake City, Utah

[73] Assignee: Film Cassette Inc., Salt Lake City, Utah

[21] Appl. No.: 778,487

[22] Filed: Mar. 17, 1977

[51] Int. Cl.² ........................................... G11B 23/10
[52] U.S. Cl. ................................................... 242/198
[58] Field of Search .............. 242/198, 199, 200, 197; 360/132, 96

[56] References Cited

U.S. PATENT DOCUMENTS

| | | | |
|---|---|---|---|
| 2,584,733 | 2/1952 | Owens | 242/198 |
| 3,066,880 | 12/1962 | Bauer | 242/198 |
| 3,259,331 | 7/1966 | Liddle | 242/198 |
| 3,672,603 | 6/1972 | Swain | 242/198 |
| 3,684,295 | 8/1972 | Strain et al. | 242/198 |
| 3,807,840 | 4/1974 | Cook et al. | 242/198 |

Primary Examiner—George F. Mautz

[57] ABSTRACT

Cassette and reel construction improvements wherein the cassette, when out of its play or operative condition, is locked as to interior structure whereby to prevent tape loosening, slack, or foul-up; reels such as cassette reels employed herein are made in a multi-part construction, the components of which are snapped together to provide for positive leader tape securement.

6 Claims, 7 Drawing Figures

TAPE CASSETTE HAVING REEL LOCKING MEANS THEREIN

FIELD OF INVENTION

The present invention relates to cassettes and reels incorporated therein, by way of example, and more particularly (1) to a new and improved cassette wherein the tape drive system is automatically locked when the cassette is not placed in its usual operative condition; also, (2) to reels permissibly included therein wherein the recorded or recordable media such as a tape reel is made in easily molded multi-part units which, when snapped together, automatically secure the leader tape in place, for example.

DESCRIPTION OF PRIOR ART

Reels in cassettes and another context such as even film reels and sound-tape reels have the problem of securement of tape ends, such as leader tape in connection with video tape, so that there is a positive end securement as between the tape employed and the reel. Examples of prior tape usage in connection with reels and specifically cassette reels are indicated in the following U.S. patents:

Patent No.
- 3,423,038
- 3,650,495
- 3,791,609
- 3,797,779
- 3,873,045
- 3,918,802

In all of such patents there is merely indicated a wrapping of the tape about the reel, but there is no means shown whereby there can be a positive securement of tape ends, such as leader tape, which is convenient and will not slip out or become disengaged with the reel through manual manipulation. Various types of securement means such as reel spool slots or a pressure-sensitive tape have been used heretofore, but these are unsatisfactory, subject to pulling apart, tape is difficult to install, and do not comprise a positive lock.

The present invention distinguishes the prior art and specifically these prior patents in having an essentially three-piece reel construction wherein a half-hub is snap-locked to a remaining half-hub, associated with a reel flange, so that the leader tape may be routed between the two hub halves prior to their mutual securement together. Subsequently, the other reel flange is installed, again by a snap fit relative to the other two parts.

As to another aspect of the invention, the above-enumerated patents teach the employment of cassettes, but there is no means provided for locking the reels or their drive means in a position when the cassette is removed from its operative position in the player. Thus, the cassette reels may become easily displaced so as to cause an undesired slackening or even foul-up of the tape within the cassette. The present invention represents an improvement over these structures, no positive tape locking being shown therein, wherein the tape drive is automatically locked upon removal of the cassette from its play position. Accordingly, the present tape drive, see in contrast U.S. Pat. No. 3,791,609, is positively locked when the cassette is removed from its player.

BRIEF SUMMARY OF THE INVENTION

Accordingly, in the present invention a reel structure incorporating tape, film, or other recorded or recordable media, is provided or assumes a multi-part construction, the individual parts being snapped or otherwise secured together such that leader tape, for example, is positively intermeshed and held in position between adjacent hub portions of each reel. The media drive, furthermore, is positively locked against rotation when the cassette incorporating media reels is withdrawn from its player, recorder, or other electronic unit.

OBJECTS

Accordingly, the principal object of the present invention is to provide a new and improved cassette.

A further object is to provide a cassette wherein the elongate flexible media incorporated therein is essentially locked in position when the cassette is removed from its operative position relative to external equipment.

A further object is to provide an improved reel construction which is a multi-part unit easily snapped together.

A further object is to provide an improved reel construction wherein elongate flexible media means is positively positioned so that it will not inadvertently slip out of intended engagement with the reel.

A further object is to provide a video tape reel wherein the leader tape may be preliminarily secured in position in the reel prior to its final assembly.

A further object is to provide a video tape cassette wherein player construction will automatically facilitate an unlocking of otherwise locked tape drive structure, for example, relative to the cassette used by the video tape player.

The features of the present invention which are believed to be novel are set forth with particularity in the appended claims. The present invention, both as to its organization and manner of operation, together with further objects and advantages thereof, may best be understood by reference to the following description, taken in connection with the accompanying drawings in which:

While particular embodiments of the invention are hereafter shown and described, it will be obvious to those skilled in the art the various changes and modifications which may be made without departing from the essential features of the present invention and, therefore, the aim in the appended claims is to cover all such changes and modifications as fall within the true spirit and scope of the invention.

DESCRIPTION OF PREFERRED EMBODIMENTS

Figure 1:
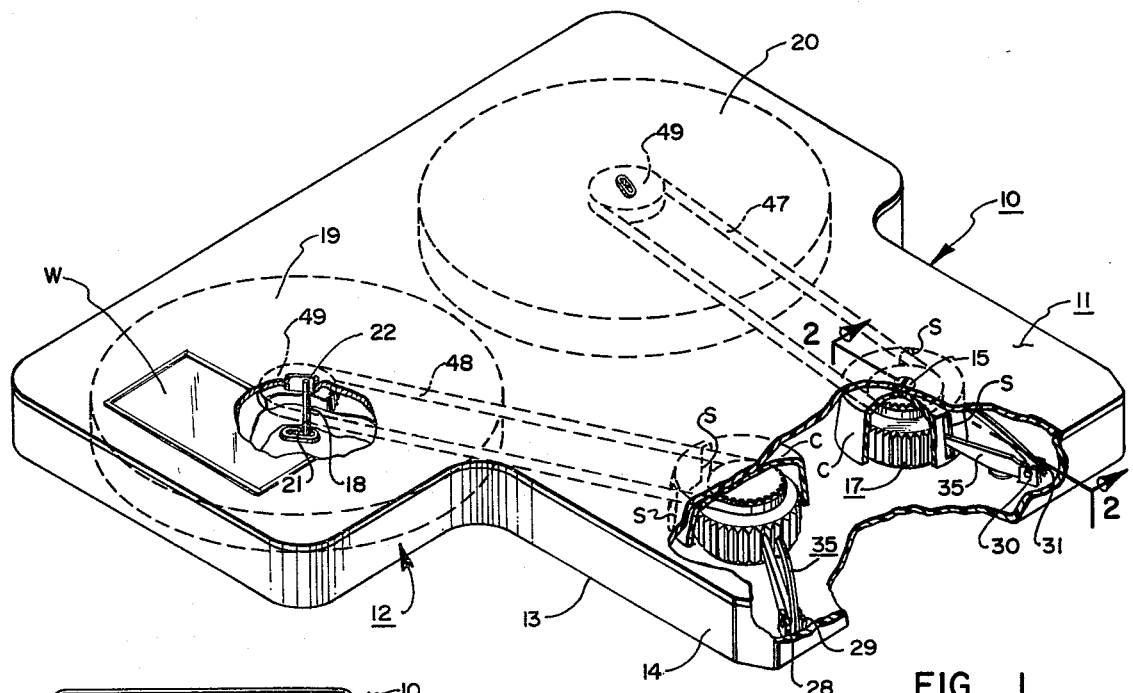
FIG. 1 is a fragmentary perspective view of a cassette incorporating the principles of the present invention, and is partially broken away for convenience of illustration.
Figure 1A:
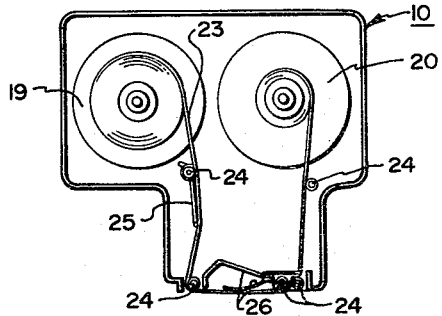
FIG. 1A is plan view of the cassette of FIG. 1 with the top removed for convenience of illustration, indicating the video tape run including requisite, run-constraining or routing elements.
Figure 2:
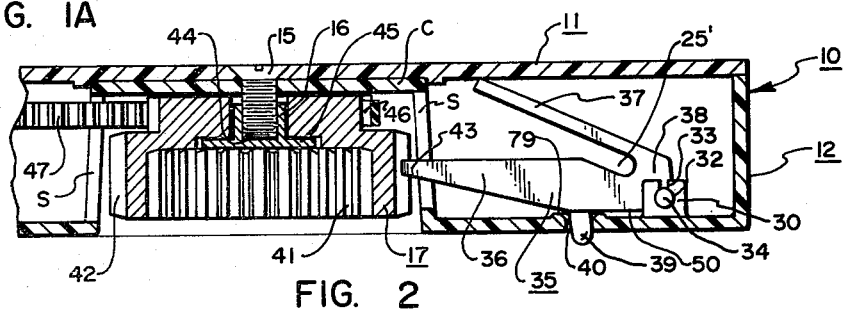
FIG. 2 is an enlarged fragmentary vertical section taken along the line 2—2 in FIG. 1, illustrating a representative tape drive with its locking mechanism.
Figure 3:
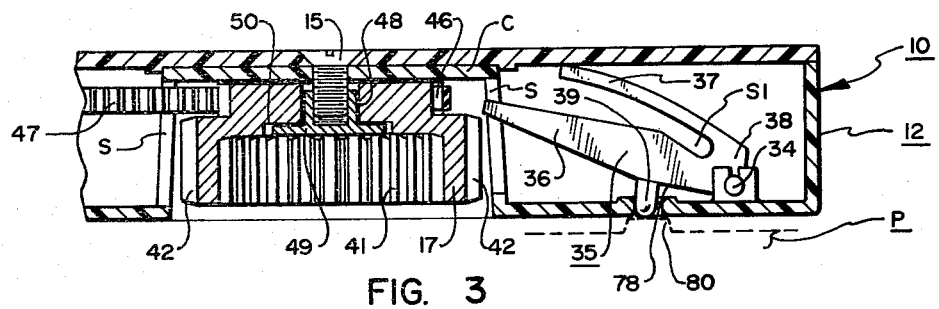
FIG. 3 is similar to FIG. 2 but illustrates that when the cassette is placed in a playing unit such as a video tape player, the latter's construction operates to actuate the spring lock of the cassette whereby to release the latter's locked finger engagement with the tape drive so that the cassette can be operated normally.

In FIGS. 1-3 the cassette 10 is provided with a top member 11 and a base member 12. Window W may be provided top member 11 so that the user can clearly see the condition of reel wind or unwind. Base member 12 will include a base 13 and peripheral side 14. Multiple attachments, including or comprising screw attachments 15, may be employed to secure together top member 11 and base member 12 and also to provide for securement for a retentive mount or bushing 16 for each player gear-drive coupler 17, both being understood as being identical. Pivotal attachments 18 may be employed for each of the reels 19 and 20, and slotted apertures 21 and 22 may be provided for the journalling of such reels 19,20. The tape 23 secured to reels 19 and 20, see FIG. 1A, may be routed over rollers 24 pivotally secured to the base member and at least one of which will be provided with a take-up spring 25. Guide structure at 26 will provide for and include the sensing window of the cassette. The tape routing and cooperating roller structure with guide window may take any one of several forms, as desired, and one instruction is shown in the inventor's copending application entitled "LONG-PLAY VIDEO TAPE CASSETTE", Ser. No. 650,413, filed Jan. 19, 1976, now U.S. Pat. No. 4,074,876, which is fully incorporated herein by way of reference.

Figure 4:
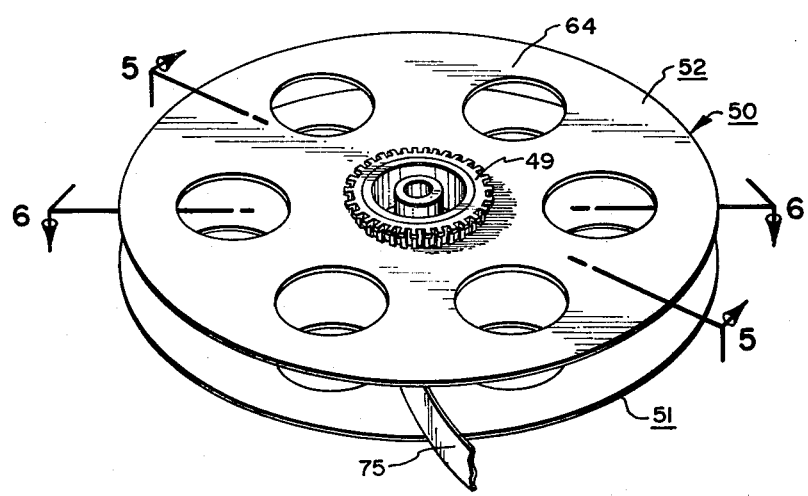
FIG. 4 is a perspective view of a reel incorporating other features of the invention.
Figure 5:
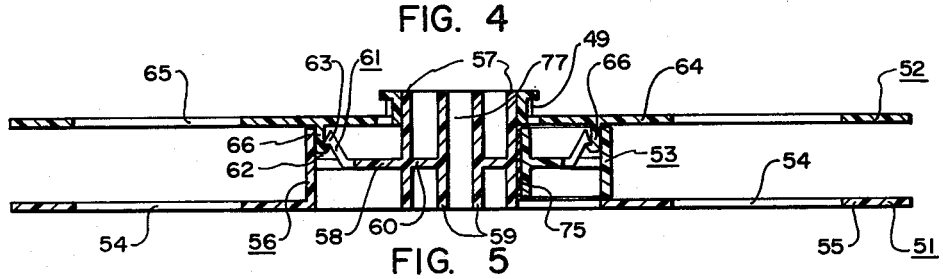
FIG. 5 is an enlarged vertical section taken along the line 5—5 in FIG. 4, illustrating the manner in which the three parts of the reel construction are mutually snapped together.
Figure 6:
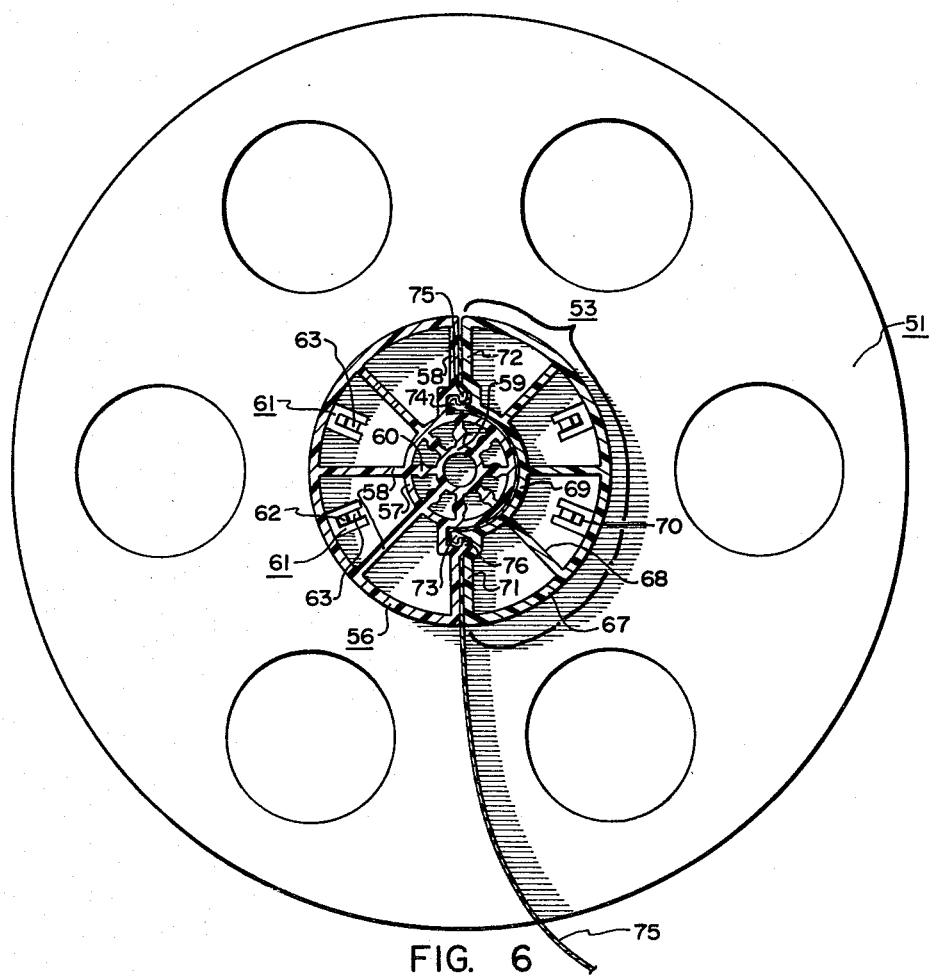
FIG. 6 is a horizontal section taken along the lines 6—6 in FIG. 4, illustrating the positive securement of leader tape, for example, between two of the three components of the reel construction.

Of special importance in the present invention are the couplers 17 with their lock mechanisms and the reel configuration for each reel 19,20 as shown in FIGS. 4-6.

Base member 12 has, upstanding from its base 13, a pair of upstanding, inverted, integral cups C having gear-belt and lock finger slots S, and also a series of upstanding, mutually-spaced bosses or ears 28-31 as shown in FIGS. 1-3. These ears, a representative ear 30 being shown in FIG. 2, each include an aperture 32 and a slot 33 communicating therewith. The ears are made of any suitable resilient, deformable plastic capable of snap-receiving and retaining pin 34 of spring lock 35. Spring lock 35 includes a lock finger 36, a spring finger 37, and a base portion 38 contiguous with and joining the lock finger 36 and spring finger 37. Spring lock 35 is preferably made from engineering plastic having a memory like a spring. An acetal plastic is suitable, with certain plastics going under the trade names DELRIN and CELCON being suitable.

A journalling pin 34 is integral with base portion 38, and there is provided a depending actuator pin 39 integral with the combination of lock finger 36 and base portion 38, the pin 39 protruding through aperture 40 of base member 12 and extending therebeyond as indicated. Each coupler 17 has an inner, toothed surface 41 serving in effect as a ring gear for cooperation with a respective gear drive spindle of the video tape player, not shown. These latter spindles are conventional in the art, are toothed or geared on their exterior, and constructed for upward insertion into the geared receiver portion 41 of each coupler 17. Exterior, toothed, gear portion 42 is supplied each coupler, and its teeth are mutually spaced to allow for the selective reception of the tip 43 of locking finger 36. Retainer mount 16 comprises a representative support portion for each of the respective couplers 17 and has a threaded interior at 44 for threadedly receiving the elongate shank of screw 15. The upper surface 45 of bushing or retainer mount 16 may be provided with a nylon or TEFLON washer, if desired, or indeed itself may be made of such material. In any event, there is provided a smooth surface at 45 to assure a smooth bearing engagement as between the member 16 and the respective coupler 17.

Each coupler will, of course, be provided with toothed, gear portion 46, which cooperates with annular, representative interiorly toothed gear belt drive 47. Additionally, undercut aperture 48 is supplied for receiving the bushing and providing a relief area for bushing head 49 and 50.

In resuming a discussion of spring lock 35, it is seen that each of the same is provided with a slot S1 to aid the resiliency and hence spring-back of spring finger 37 relative to lock finger 36.

FIGS. 2 and 3 illustrate the operation of spring lock 35. When the cassette 10 is physically removed from the video player, then there will be no abutment as to depending actuator pin 39, so that the same will protrude completely downwardly through aperture 40 such that the bottom surface 78 of the spring lock engages the upper boss surface 79 of base member 12 upon insertion of the cassette in the tape player. Such external player P wil include the usual protuberance 80 in its cassette receiver slot: thus, upon cassette insertion therein, then such abutment 80 will engage actuator pin 39 so as to force the lock finger upwardly as shown in FIG. 2, out of engagement with gear portion 42 of the drive coupler 17. There is thus a spring deformation proximate base portion 38 and spring finger 37 which, when the cassette is removed so that protuberance 80 no longer engages actuator pin 39, will force the spring finger 37 of the spring lock 35 back into engagement position with gear portion 42, in the manner seen in FIG. 2.

Thus, FIG. 2 illustrates the usual configuration of the spring lock 35 at its engagement with gear portion 42 of respective couplers 17, whereby to preclude these couplers from being subject to inadvertent rotational displacement. Hence, the tape of reels remains fixed in this position and not able to foul or to become loose in the cassette. When the cassette is inserted in a tape player, however, then the player's abutment or protuberance actuator 80 engages pin 39 so as to force the lock finger to assume a position out of engagement with the coupler, see FIG. 3, such that both of the couplers will be allowed to turn in accordance with the rotation of the drive spinders of the player. As is well known in the art, the drive spindles of a video tape player may be driven in a forward mode, wherein one spindle is driven and the other is free to rotate, or in a reverse mode in which the opposite spindle is driven and the other is free for rotation, or both of the spindles may be made integral with forward and reverse drives.

The interiorly-toothed gear belt drives 47 and 48 will of course be coupled to respective gear portion 49 of reel construction 50. Such reel construction will be used for both of the reels 19,20 in FIG. 1.

The reel construction includes first, second and third members 51-53 which are mutually locked together in a manner hereinafter described and for the purposes set forth. The first, or base member 51 may include a series of lightening or viewing apertures 54 and flange 55. Upstanding from flange 55 is an annular hub portion 56 which is joined to inner ring-shaped portion 57 by brace webs 58. Tubular portion 59 is secured by a series of integral fingers 60 with tubular portion 57. It will be understood that each of the members 51-53 is respectively molded as an integral part. Integral with hub portion 56 are a series of latch engagement portions 61, two in number, for example, as seen in FIG. 6. These latching portions include insertion aperture 62 and also hooks or latches 63.

As to the top or second member 52, the same, in addition to including gear portion 49, is provided with reel, side flange 64 having lightening or viewing apertures 65 and also provided with a series of depending hooks or latches 66. These are hook-shaped and are adapted to be thrust into and through apertures 62 to engage a respective hook-shaped latch 63. Prior to the insertion of latches 66 into apertures 62, there will be an assembly of third member 53 with first member 51. The third member 53 simply comprises a hub half 67 provided with web braces 68 that are secured to inner, cylindrical portion 69. All of this structure is integrally formed and preferably molded. The third member includes a series of latching portions 70 that may be similar to or identical with latching portions 61 of first member 51 and thus be provided with latching means 70A similar to portions 63. Webs 71 and 72 are likewise provided with hook portions 73 and 74 for cooperating with latch or hook portions 75 and 76 of first member 51. The reel is molded from a suitable resilient plastic such as a suitable pylethylene or DELRIN, so that third member 53 may be snapped in place in the manner shown in FIG. 6. Thereafter, and with latch portions 61 and 70 now being available and in line with hooks or latches 66 of the top member, i.e. or second member 52, the latter need only be thrust downwardly in a position shown in FIG. 5. so that all three members 51-53 are latched together.

Leader tape 75 is routed as indicated in FIG. 6 on both reels prior to the emplacement of third member 53. It is this member in cooperation with the first member 51, which locks in place and secures the leader tape initially, on both reels, prior to the mounting in place of second member 52 as seen in FIG. 5. Subsequently, the leader tape is centrally cut and the video tape secured to opposite ends thereof.

The structures of FIGS. 4-6 thus indicate a highly useful reel construction wherein three molded parts are locked together to provide the same and, in such locking together, will automatically secure leader tape ends. This precludes the necessity of fishing the tape into slots or otherwise providing some means by which the leader tape ends may be securely fastened to the central part of each reel.

The reel construction used is ideally suited to the cassette of FIGS. 1-3. Central apertures 77 as so formed are adequate for bearing or pivot placement of each reel in the cassette in the manner indicated in FIG. 1. The reels, however, can be used in other contexts and environments of other types of equipment such as sound tapes, cameras, projectors, and so forth.

While the spring-lock 35 is deemed best used with the spindle receivers or couplers 17, the lock can be employed directly with the reels where the same are provided lock-engaging means such as gear teeth or the like in their composite structure.

What is provided herein is a cassette structure wherein the reels, e.g. by their drives, can be locked when the cassette is not in use so that the tape cannot tend to unwind or become fouled within the cassette. When, however, the cassette is stalled in the video tape player, then its usually provided protrusion structure at 80 in FIG. 5, will be sufficient to raise the spring-lock 35 upwardly for each coupler 17 so that the said reels are now free to revolve in accordance with the movement of the couplers. The reels for the cassette are ideally suited for ease of molding and for mutual inter-connection so that the leader tape employed is positively fixed to the reel in the manner seen in FIG. 6.

As to the cassette, top member 11 and base member 13 jointly comprise a cassette housing having the usual forward, tape sensing opening, not shown. Depending actuator pin 39 may be separate or integral as shown, and generally comprises a lateral or transversely extending, elongate protuberance. Finally, while the invention has been described specifically in terms of video-tape cassettes, the same principle can be used with other types of cassettes and housings, considered "cassettes", by way of example.

I claim:

1. A cassette including, in combination: a cassette housing having a pair of reels journalled therein; a pair of couplers journalled in said cassette housing; a pair of endless means intercoupling said couplers with respective ones of said reels; flexible, elongate media means routed through said cassette and wound upon said reels; a pair of spring-locks carried by said cassette and respectively spring-biased toward releasable locking engagement with respective ones of said couplers; and means for urging said spring-locks out of engagement with said couplers when said cassette is disposed in an operative condition relative to external equipment.

2. The combination of claim 1 wherein said cassette includes a pair of apertures, said urging means comprising protrusions proceeding through said apertures and extending from respective ones of said spring-locks.

3. In a cassette construction having a cassette housing, a pair of reels journalled within said cassette housing, a pair of externally accessible and driveable couplers rotatably carried by said cassette housing, endless means intercoupling a respective coupler to a respective reel, and flexible elongate media means operatively routed through said cassette housing and wound upon said reels: an improvement comprising plural, spring-lock means movably secured to said cassette housing, releasably locking engaging a respective one of said couplers, and each having outwardly accessible actuatable means for positioning its spring-lock means out of engagement with respect to said respective couplers.

4. The combination of claim 3 wherein said couplers each carry a peripherally toothed surface, each of said spring lock means having a locking finger operatively engaging said toothed surface and constructed for positionment between adjacent teeth thereof.

5. The combination of claim 3 wherein said spring-lock means respectively comprise elements having a locking finger, a resilient spring finger interiorly engaging said cassette housing, a base portion interposed between and integral with said locking finger and said spring finger, a transverse pin portion integral with said base portion and journalled to said cassette housing, and actuatable protrusion means transversely extending from said locking fingers.

6. The structure of claim 3 wherein each of said reels include mutually spaced reel flanges joined by a first hub portion, leader tape forming opposite extremities of said media means and passing over each of said hub portions; and a separate, second hub portion snap-locked to a respective first portion, whereby to secure said leader tape between said first and second hub portions of each of said reels.

* * * * *